United States Patent [19]

Thompson, Jr.

[11] Patent Number: 4,546,569
[45] Date of Patent: Oct. 15, 1985

[54] NON-TANGLING TROT-LINE SPOOLING APPARATUS

[75] Inventor: Joseph V. Thompson, Jr., Houston, Tex.

[73] Assignee: E-Zee Company, Pearland, Tex.

[21] Appl. No.: 550,577

[22] Filed: Nov. 10, 1983

[51] Int. Cl.⁴ ............................................. A01K 97/00
[52] U.S. Cl. ...................................................... 43/57.3
[58] Field of Search .......................................... 43/57.3

[56] References Cited

U.S. PATENT DOCUMENTS

| | | | |
|---|---|---|---|
| 1,634,030 | 6/1927 | Korkames | 43/57.3 |
| 2,541,920 | 2/1951 | Hammock | 43/57.3 |
| 2,804,716 | 9/1957 | Adkison | 43/57.3 |
| 3,060,622 | 10/1960 | Lowry | 43/57.3 |
| 3,200,533 | 8/1965 | Early | 43/57.3 |
| 3,803,750 | 4/1974 | Nunley | 43/57.3 |

FOREIGN PATENT DOCUMENTS 63949 9/1941 Norway ................ 43/57.3

Primary Examiner—Gene P. Crosby
Attorney, Agent, or Firm—Arnold, White & Durkee

[57] ABSTRACT

A non-tangling trot-line spooling apparatus for spooling a trot-line having a set-line with spaced apart leaders and hooks is disclosed. The spooling apparatus includes a tubular member positioned to one end of the apparatus for securely and safely receiving each hook on the trot-line. The tubular member in combination with a gripping member located to the opposite end defines a spooling area for receiving the set-line as the trot-line is reeled in. The tubular member includes an opening and a slot cut longitudinally to the tubular member to permit the barbed ends of each hook to be inserted into the tubular member and retained in the slot. A sliding member is provided for closing the opening in the tubular member to prevent the inserted hooks from falling out.

12 Claims, 6 Drawing Figures

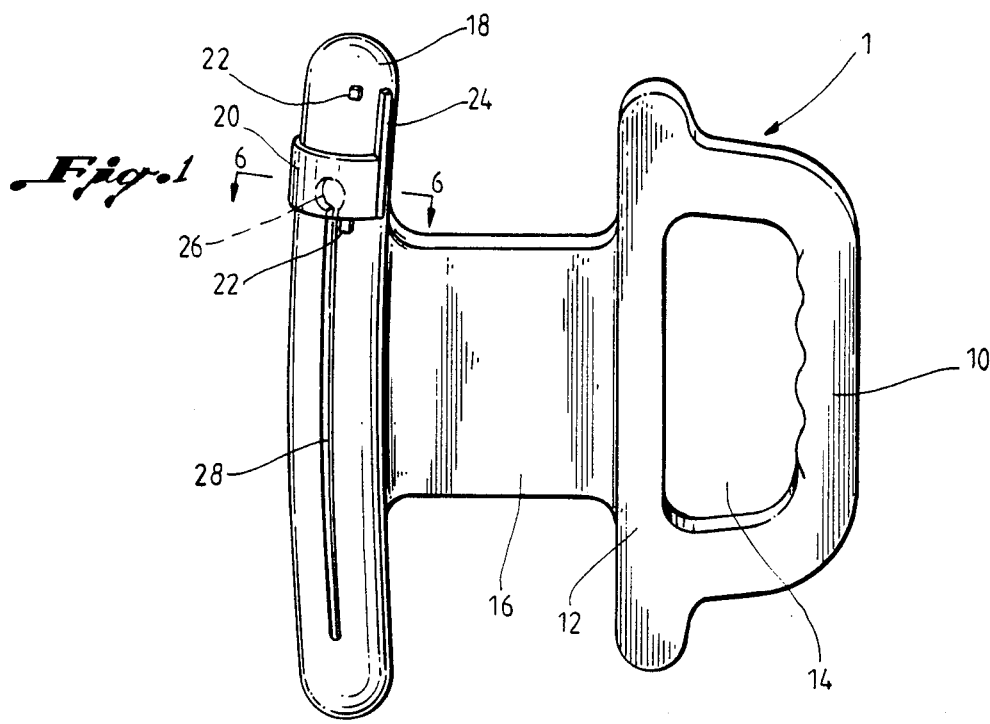
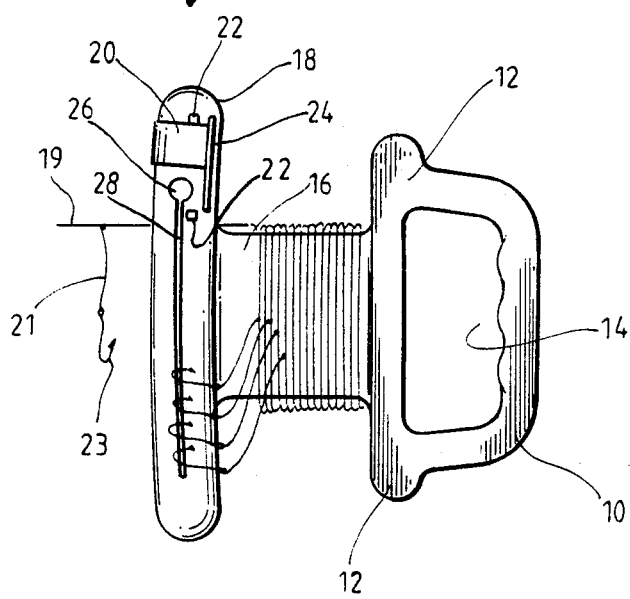
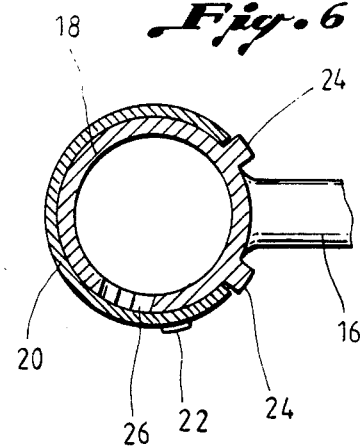

NON-TANGLING TROT-LINE SPOOLING APPARATUS

BACKGROUND OF THE INVENTION

The present invention relates to fishing equipment. More particularly, the invention relates to an apparatus for spooling a trot-line into a compact and tangle free assembly in which the fish hook points are safely and securely retained away from the trot-line fisherman.

A trot-line consists of a set-line of any desired length along which at regularly spaced intervals are attached leader lines, each leader terminating with a hook. Normally, a single barbed fish hook is employed, but any type of hook is possible. For example, when fishing with the trot-line across a fresh water stream, a single barb hook might preferably be used. When fishing in salt water bays, a treble hook might be preferable.

Trot-line assemblies are very popular with avid fishermen because it offers the opportunity to fish from several baited hooks without requiring constant attention. The hooks can be baited and left until sometime later when the trot-line can be "run" to see if any fish have been caught. Due to the very nature of the construction of a trot-line, namely, the presence of the fish hooks distributed along the length of the set-line, the reeling-in and storage of the device almost always results in a tangled mesh unless considerable effort is given to the handling of the hooks as encountered doing the reeling-in process.

There have been many attempts in the prior art to provide a spooling apparatus for a trot-line, all the way from winding the entire assembly, set-line, leaders and hooks onto a spool where the hooks are simply woven into the bundle of set-line, to a device such as that shown in FIG. 5. FIG. 5 illustrates a piece of PVC pipe which has cut therein a V-shaped notch opening with a longitudinal slot running from the opening along the length of the pipe. As each hook is encountered, the barbed end of the hook is inserted into the opening in the PVC pipe and moved down the slot so that the barbed end of the hook is captured within the interior of the PVC pipe. The remainder of the set-line and leaders are then left to hang loose from the PVC pipe. This arrangement, however, does not solve the problem of tangling of the set-line, nor does it provide a compact unit, and is therefore subject to snagging and entanglement with other equipment within a fishermen's fishing box, etc. Additionally, the loosely hanging set-line and leaders, when subjected to entanglement with other devices can cause the fish hooks to be pulled from within the slot and therefore become very dangerous for possible injury to any one who comes in contact with the carrying assembly.

Accordingly, it would be advantageous to provide a non-tangling spooling apparatus which provides a compact unit for safely and securely holding the barbed ends of the fish hooks away from contact with the user of the trot-line. It would also be advantageous to provide a spooling apparatus which permits the fisherman to exert a pulling force on the trot-line to propel, for example, a fishing boat along the trot-line as the set-line is reeled in.

SUMMARY OF THE INVENTION

In accordance with the present invention, a non-tangling trot-line spooling apparatus for spooling up and storing a trot-line having a set-line with spaced apart leaders attached thereto, each leader having a hook at the opposite end, is disclosed. The apparatus according to the invention comprises a gripping portion positioned to one end of said apparatus. The gripping portion contains an aperture proximal the end of the apparatus to permit the fingers of a hand to pass through the aperture and grasp a portion of the apparatus between the fingers and the palm of the hand. A knuckle portion of the apparatus is located on the knuckle side of a hand gripping the apparatus.

A tubular member is positioned to the opposite end of said apparatus and includes an opening therein at one end of said member for permitting the curved portion of each hook which includes the barbed tip to pass into the interior cavity of said tubular member. A slot runs from the opening along the length of the member. The slot has a width which permits each hook inserted into the opening to pass down the slot, but not escape from within said tubular member. A means for closing the opening is also included to prevent the escape of hooks through the opening once the trot-line has been spooled onto the apparatus.

The apparatus further includes a connecting member coupling said gripping element to said tubular element. The connecting element, the knuckle portion of said gripping portion, and the tubular element define a spooling area for receiving and retaining the trot-line set-line as the set-line is spooled around said connecting member. In this manner, the line, leaders, and hooks are secured to the apparatus in a non-tangling fashion as each hook is securely inserted into said tubular member.

The present invention further includes a sliding member mounted to the exterior of said tubular member for movement from a first position in which the opening is exposed for receiving the trot-line hooks to a second position covering said opening. In an alternate embodiment of the invention, a plug and flexible elastic retaining member connecting the plug to the tubular member is provided. When the plug is inserted into the opening in said tubular member, the elastic flexible retaining member is stretched across the hooks contained in the slot to further secure the hooks within the tubular member.

In yet another embodiment of the invention, a spring loaded curved element is contained interior to the tubular member with a portion of the curved member protruding from the interior of the tubular member through the opening therein. Pressure onto the spring loaded member by the tip of the fish hook will depress the spring member inwardly to the tubular member permitting the insertion of the hook into the slot. In a similar manner the hook is withdrawn. The curved portion of the spring loaded member extends inwardly far enough to permit an upward force by the fish hook on the spring member to rotate the spring loaded member inwardly to permit the fish hook to be extracted.

For each of the embodiments of the invention, the tubular member is curved or bowed in the direction of the connecting member to permit a pulling force to be exerted on the set-line without the set-line slipping off the apparatus.

BRIEF DESCRIPTION OF THE DRAWINGS

For a full understanding of the invention reference should be had to the following detailed description taken in connection with the accompanying drawings in which:

FIG. 1 is a side view of the preferred embodiment of the present invention;

FIG. 2 is a side view of the preferred embodiment of the present invention with a trot-line spooled thereon;

FIG. 6 is a partial cut-away top view of the C-shaped closure member for closing the opening of the fish hook retaining member in the preferred embodiment of the present invention.

In the following description, similar reference numerals refer to similar parts throughout the views of the drawings.

DETAILED DESCRIPTION OF THE PREFERRED EMBODIMENT OF THE PRESENT INVENTION

Figure 4:
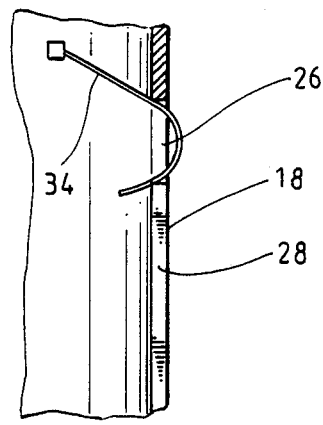
FIG. 4 is an illustration of a portion of the spooling apparatus which illustrates an alternate method for closing the opening in the fish hook retaining member.

Turning now to the figures and first to FIG. 1, there is illustrated the non-tangling trot-line spooling apparatus 1 of the present invention. The apparatus 1 is preferably constructed from a plastic injection molding process as a single unitary construction comprised of several functional elements. A portion of the apparatus 1 is designed to facilitate the gripping of the apparatus by the hand. An aperture 14 is provided at one end of the apparatus 1 for this purpose. The aperture 14 permits the fingers of a hand to pass through the apparatus and grasp between the fingers and the palm of the hand a portion 10 of the apparatus. A second portion, or knuckle portion 12, extends from portion 10 around the knuckle side of the fingers of the hand grasping element 10.

To the opposite end of the apparatus 1 is located the fish hook retaining element 18. Element 18 is a tubular member which is hollow inside and contains through the wall of the member an opening 26 and a slot 28. The slot 28 runs for some length along the tubular member and terminates into the opening 26. A C-shaped spring loaded member 20 is positioned to the outside of the tubular member. The C-shaped element 20 and tubular member 18 are designed to permit sliding of the C-shaped member 20 up and down the outside surface of the tubular member 18. Stops 22 are positioned on the exterior surface of the tubular member 18 to confine movement of the C-shaped member from a first position in which the opening 26 is exposed to permit insertion of fish hooks therethrough to a second position in which the C-shaped member 20 covers the opening 26 to prevent the fish hooks already inserted from coming out through the opening 26. A guide member 24 is also provided on the exterior surface of the tubular member 18 to further retain the C-shaped fitted member 20 within a defined area of travel along the exterior surface of the tubular member 18. FIG. 6 further illustrates the relationship between the C-shaped element 20, tubular member 18, stops 22, and guides 24.

Connecting the tubular member 18 to the gripping portion of the apparatus 1 is a connecting element 16. Element 16 is positioned approximate the center of the length of the tubular member and the knuckle portion 12 of the gripping end of the apparatus 1. In combination, the tubular member 18, connecting member 16, and knuckle portion 12 of the gripping end of the apparatus define a spool for receiving and storing the set-line of the trot-line as it is reeled in.

To enable the fisherman to exert a pulling force onto the set-line of the trot-line as the reeling process occurs, the tubular member 18 is bowed in the direction of the connecting member 16 to provide a spool flange which tends to prevent the set-line from slipping off as a pulling force is exerted on the set-line. In a similar fashion, the knuckle portion 12 is slightly elongated and curved to provide the maximum spooling area possible.

The operations of the present invention can best be understood with reference to FIG. 2 which illustrates the apparatus according to the preferred embodiment of the present invention with a portion of a trot-line wound about the connecting member 16. As each leader 21 arrives at the spooling apparatus 1, the hook 23 connected to one end of the leader is inserted into the opening 26 and pulled into the slot 28. This results in the barbed end of the hook 23 being safely and securely stored inside the tubular member 18. The wrapping process of wrapping the set-line 19 around the connecting member 16 continues until all of the leaders and hooks 21,23 have been wound onto the spooling apparatus and positioned in the slot 28. At this point, the C-shaped element 20 is moved from the first position where the opening 26 was exposed for receiving the fish hooks to the second position in which the opening 26 is closed. The guide member 24 attached to the exterior surface of the tubular member 18 acts to guide the C-shaped element 20 from its first to its second position. The stops 22 limit the movement of the C-shaped element 20 from the first to the second position. As wound, the set-line 19 and leader lines 21 are compactly secured to the spooling apparatus 1 in a non-tangling fashion. The hooks are securely held within the slot 28 thus permitting the entire spooling apparatus 1 with trot-line to then be stored away for future use.

Figure 3:
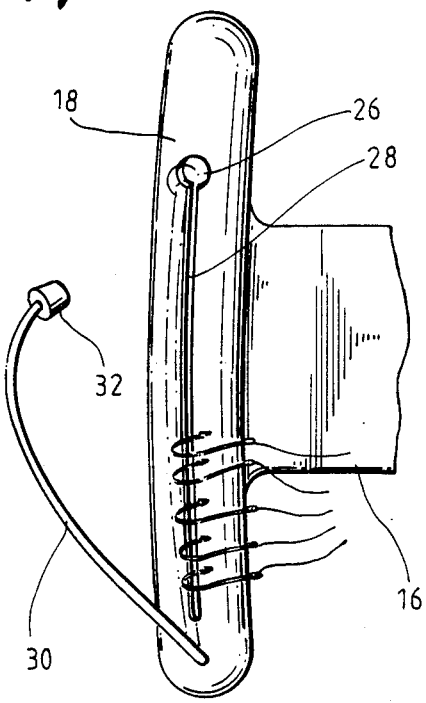
FIG. 3 is an illustration of an alternate embodiment for retaining the fish hooks within the spooling apparatus.
Figure 5:
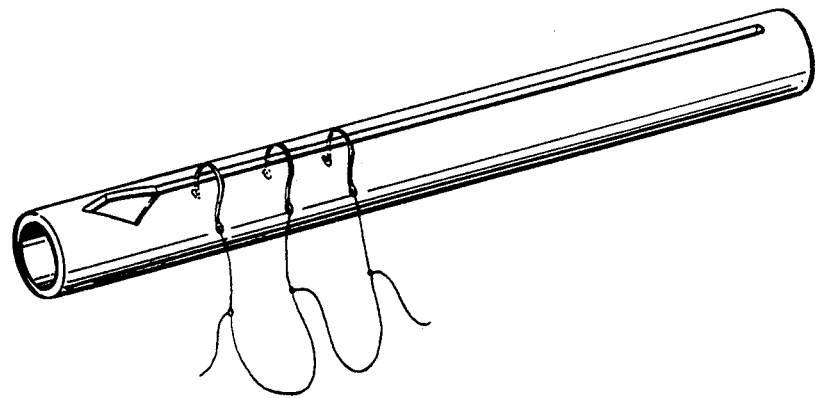
FIG. 5 is an illustration of a prior-art method of spooling a trot-line.

In an alternate embodiment shown in FIG. 3, the C-shaped sliding member 20 is replaced by a plug 32 which is connected to the tubular member 18 by a flexible and elastic member 30. The plug and elastic member 30 are connected to the tubular member at the opposite end of the tubular member 18 than the opening 26. In this manner, when the spooling operation is completed, the plug 32 can be inserted into the opening 26 to be securely held therein with the flexible and elastic member 30 passing over the fish hooks contained in the slot 28 thereby to further securely contain the fish hooks in the tubular member 18.

Another alternate embodiment for providing a closure to the opening 26 is illustrated in FIG. 4. FIG. 4 shows a spring-loaded curved member 26 that is mounted to the interior of the tubular member 18. A portion of the curved spring protrudes through the opening 26 thereby to seal the opening. However, pressure from a hook to be inserted will cause the spring member 34 to rotate inwardly and permit the hook to pass into the slot 28. In a similar manner, an upward extraction force exerted by a hook onto the portion of spring member 34 which curves inwardly to a interior of the tubular member 18 from the portion protruding through the opening 26 also causes the spring member 34 to rotate inwardly and permit the extraction of the hook. For the embodiment of FIG. 4, the spring loaded member 34 provides a constant seal on the opening 26 without any further operations by the user of the apparatus.

To enable the user of the apparatus 1 to exert a tugging force on the set-line 19 during the spooling operation, the tubular member 18 has been slightly bowed in the direction of the connecting member 16. Pulling on the set-line 19 as a result of the bowing tends to keep the string from slipping off of the flange form by the tubular member 18. Being able to pull on the set-line 19 permits a fisherman in a boat to propel the boat along the trot-line without having to grip the trot-line with his bare hands. This prevents a possible accidental hooking from an exposed hook 23. For example, a different gripping arrangement for grasping the apparatus could be provided, such as expending a rod from the knuckle portions 12 where the rod could be grasped to effect the holding and pulling functions described above. Additionally, the spooling arrangement could be provided with some sort of power drive to effect the reeling-in operation. This power could be provided by an apparatus similar to a bait cast; reel mechanism, or it could be driven by an electric motor.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. A non-tangling trot-line spooling apparatus for spooling up and storing a trot-line having a set-line with spaced apart leaders attached thereto, each leader having a hook at one end, the apparatus comprising:
   (a) a gripping portion positioned to one end of said apparatus, said portion containing an aperture proximal the end of the apparatus to permit the fingers of a hand to pass through the aperture and grasp a portion of the apparatus between the fingers and the palm of the hand, said gripping portion having a knuckle portion located on the knuckle side of a hand gripping the apparatus;
   (b) a hollow tubular member positioned to the opposite end of said apparatus, said tubular member having,
      (i) an opening proximal one end for permitting the curved portion of each hook which includes the barbed tip to pass into the interior cavity of said tubular member,
      (ii) a slot running from said opening along the length of said member, said slot having a width which permits each hook inserted into said opening to pass down the slot, and
      (iii) a means for closing said opening to prevent the escape of hooks through the opening once the trot-line has been spooled onto the apparatus; and
   (c) a connecting member coupling said gripping element to said tubular element, said connecting element, said knuckle portion of said gripping portion, and said tubular element defining working surface of a spool area for receiving and retaining the trot-line set-line as the set-line is spooled around said connecting member so that the line, leaders, and hooks are secured to the apparatus in a non-tangling fashion.

2. The apparatus of claim 1 wherein said means for closing the opening in said tubular member is a sliding member mounted to said tubular member and movable from a first position in which said opening is exposed for receiving the trot-line hooks to a second position covering said opening.

3. The apparatus of claim 1 wherein said apparatus is injection molded in plastic as a single unit.

4. The apparatus of claim 1 wherein said means for closing said opening is a plug retained to said tubular member by a flexible elastic member such that when said plug is inserted into said opening to retain the hooks in said tubular member, said elastic member securely retains the portions of the hooks outside said slot against said tubular member.

5. The apparatus of claim 1 wherein said means for closing said opening comprises a curved member contained inside said tubular member and covering said opening therein in a spring loaded fashion to permit each hook to be inserted and extracted by pressing in on said curved member with each hook as the hook is inserted or removed, said spring loaded curved member snapping back to securely retain the remaining hooks in said tubular member.

6. The apparatus of claim 1 wherein said tubular member is curved inwardly to said connecting member to permit pulling on the trot-line as the set-line is spooled in.

7. A non-tangling trot-line spooling apparatus for spooling up and storing a trot-line having a set-line with spaced apart leaders attached thereto, each leader having a hook at one end, the apparatus comprising:
   (a) a gripping portion positioned to one end of said apparatus, said portion permitting the hand to grasp a portion of the apparatus between the fingers and the palm of the hand, said gripping portion having a knuckle portion;
   (b) a hollow tubular member positioned to the opposite end of said apparatus, said tubular member having,
      (i) an opening proximal one end for permitting the curved portion of each hook which includes the barbed tip to pass into the interior cavity of said tubular member,
      (ii) a slot running from said opening along the length of said member, said slot having a width which permits each hook inserted into said opening to pass down the slot, and
      (iii) a means for closing said opening to prevent the escape of hooks through the opening once the trot-line has been spooled onto the apparatus; and
   (c) a connecting member coupling said gripping element to said tubular element, said connecting element, said knuckle portion of said gripping portion, and said tubular element defining a working surface of a spool area for receiving and retaining the trot-line set-line as the set-line is spooled around said connecting member so that the line, leaders, and hooks are secured to the apparatus in a non-tangled fashion.

8. The apparatus of claim 7 wherein said means for closing the opening in said tubular member is a sliding member mounted on said tubular member and movable from a first position in which said opening is exposed for receiving the trot-line hooks to a second position covering said opening.

9. The apparatus of claim 7 wherein said apparatus is injection molded in plastic as a single unit.

10. The apparatus of claim 7 wherein said means for closing said opening is a plug retained to said tubular member by a flexible elastic member such that when said plug is inserted into said opening to retain the hooks in said tubular member, said elastic member securely retains the portions of the hooks outside said slot against said tubular member.

11. The apparatus of claim 7 wherein said means for closing said opening comprises a curved member contained inside said tubular member and covering said opening therein in a spring loaded fashion to permit each hook to be inserted and extracted by pressing in on said curved member with each hook as the hook is inserted or removed, said spring loaded curved member snapping back to securely retain the remaining hooks in said tubular member.

12. The apparatus of claim 7 wherein said tubular member is curved inwardly to said connecting member to permit pulling on the trot-line as the set-line is spooled in.

* * * * *